Aug. 29, 1944.   M. Z. DELP ET AL   2,356,979
BUMPER
Filed Sept. 18, 1942
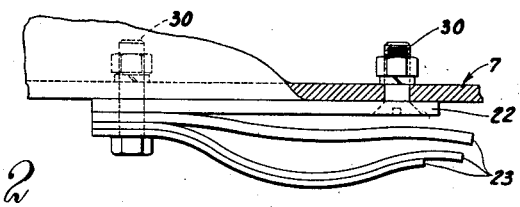
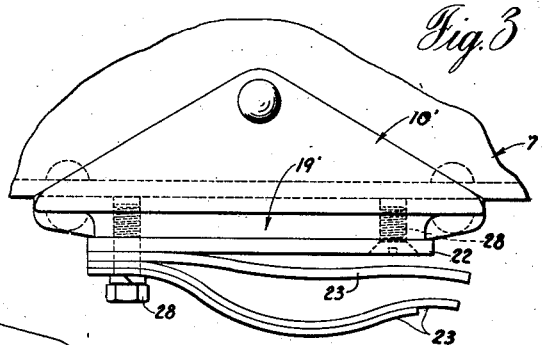
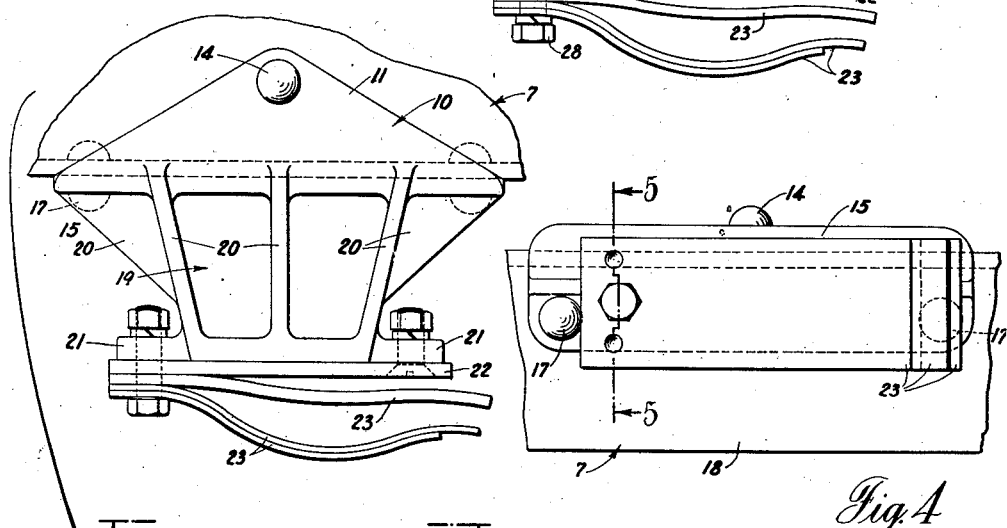
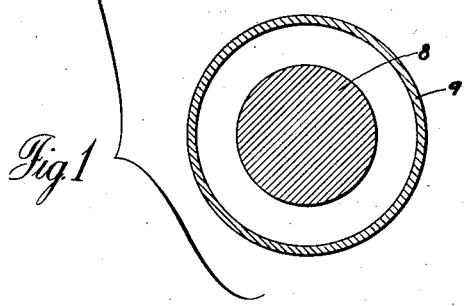
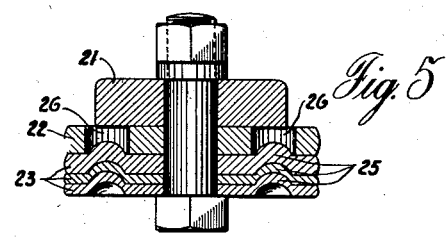
INVENTORS.
Myers J. Delp and Lloyd M. McCormick
BY
Brown, Jackson, Boettcher & Dienner
ATTORNEYS Patented Aug. 29, 1944

2,356,979

UNITED STATES PATENT OFFICE 2,356,979

BUMPER

Myers Z. Delp, South Bend, Ind., and Lloyd A. McCormick, Niles, Mich., assignors to The Studebaker Corporation, South Bend, Ind., a corporation of Delaware Application September 18, 1942, Serial No. 458,800

5 Claims. (Cl. 267—36)

Our present invention relates to a bumper, and more particularly to what is known as an axle frame bumper.

It is an object of our invention to provide a bumper adapted to be disposed between the frame and axle of a vehicle wherein the axle is of the floating type to provide a means for preventing the axle from striking the frame and cushion the shocks caused by the wheels mounted on the ends of the axle in striking obstacles and the like.

In its preferred form the bumper of our invention comprises a bumper plate which is adapted to be disposed in fixed relation with respect to the vehicle frame and includes a spring means, preferably a leaf spring, secured to the bumper plate and disposed between it and the axle or axle housing as the case may be.

The structure of the present invention provides an economical bumper of the character described and may be readily assembled to a vehicle.

Now, in order to acquaint those skilled in the art with the manner of constructing and utilizing a device in accordance with the teachings of our invention, we shall describe in conjunction with the accompanying drawing certain preferred forms of the invention.

In the drawing:

Figure 1 is a side elevational view of one form of the invention adapted to be used with a vehicle having a pair of rear axles, the bumper shown being adapted to be employed in connection with the rear rear axle, and the axle and axle housing of a vehicle being shown in section;

Figure 2 is a side elevational view, partly in section, illustrating the bumper of the present invention applied to the frame of a vehicle as used in conjunction with a front axle;

Figure 3 is a side elevational view illustrating the application of our invention to the front rear axle of a dual rear axle assembly;

Figure 4 is a bottom view taken substantially on the line 4—4 of Figure 1 and looking in the direction indicated by the arrows; and Figure 5 is a detail vertical sectional view, certain parts being shown in elevation, taken substantially on the line 5—5 of Figure 4 and looking in the direction indicated by the arrows.

Referring now to Figures 1, 4 and 5, we have shown a vehicle frame comprising a channel shaped member 7, a portion of which is disposed immediately above a free floating axle 8 and axle housing 9 of known construction. As is well known, the axle 8 and the axle housing 9 are normally disposed in spaced relation with respect to the longitudinal channel member 7, and when the wheels mounted on the ends of the axle 8 strike obstacles or the like the axle 8 and axle housing 9 move upwardly toward the frame member 7. It is necessary in a vehicle of this type to provide some means for preventing the axle housing from striking the frame and absorb shocks which would otherwise be transmitted. This means, according to the present invention, comprises a right angle bracket 10 having a vertical wall 11 secured to the vertical wall 12 of the channel member 7 by means of a rivet 14. The horizontal wall 15 of the bracket 10 is secured by a pair of rivets 17, one at each end of the bracket, to the lower horizontal wall 18 of the channel member 7. The bracket comprises a pair of lugs 21 formed integral therewith and which are spaced from the horizontal wall 15 by a body portion 19 reinforced by a plurality of ribs 20. A bumper plate 22 is disposed in fixed relation to the lower end of the bracket, and a leaf spring comprising a plurality of spring leaves 23, is secured adjacent one end to the bumper plate 22 and bracket 10 by means of the nuts and bolts provided for each lug 21. Preferably, the fixed ends of the spring leaves 23 are provided with interfitting detents 25 which prevent lateral and longitudinal shifting of the spring leaves with respect to each other when secured to the bumper plate and bracket in the manner described above.

It is also desirable to provide a pair of holes 26 in the end of the bumper plate 22 adjacent the fixed ends of the spring leaves 23, these holes being adapted to receive the detents 25 of the spring leaf disposed adjacent the bumper plate 22 to prevent lateral and longitudinal shifting of this spring leaf relative to the bumper plate. The several leaf springs 23 may be of substantially the same length, or slightly greater than the length of the bumper plate 22, and are also of substantially the same width.

It will be apparent that when a wheel mounted on the end of the axle 8 strikes an obstruction, forcing it upwardly toward the channel member 7, that the axle housing 9 will engage the lowermost spring leaf and compress the leaf spring thus absorbing the shock. It will be understood, of course, that the several leaves are made of spring steel so that they will return to their original form and condition upon repeated distortion thereof in absorbing shocks.

In the forms of the invention shown in Figures 2 and 3 like reference numerals indicate like parts described in conjunction with Figures 1, 4 and 5.

The only difference in the form of the invention shown in Figure 3, as compared with Figure 1, is in the bracket 10' which, it will be observed, has a body portion 19' of less height than the body portion 19 of the first form and consequently does not space the leaf spring as far from the channel member 7. This form of the invention is adapted for use with the front rear axle of a dual rear axle assembly. Also, in this form of the invention, the bumper plate 22 is secured to the body portion 19' of the bracket by threaded studs 28. In Figure 2 the bumper plate 22 is secured directly to the channel member 7, together with one end of the spring leaves, by the nuts and bolts 30. This form of mounting means is particularly adaptable for use with the front axle assembly of a vehicle.

While we have shown what we consider to be the preferred forms of our invention, it will be understood that various rearrangements and modifications may be made therein without departing from the spirit and scope of the invention.

We claim:

1. A bumper for a vehicle having a frame and and axle normally disposed in spaced relation to said frame comprising, a bracket secured to said frame, a bumper plate secured to said bracket and spaced thereby intermediate said frame and said axle, and a leaf spring secured adjacent one end and to one end of said bumper plate and disposed between the latter and said axle the free end of said leaf spring extending in the same direction as the other end of said bumper plate so that said bumper plate overlies a portion of the free end of said leaf spring.

2. A bumper for a vehicle having a frame and an axle normally disposed in spaced relation to said frame comprising, a bumper plate adapted to be secured in fixed relation with respect to said frame between the latter and said axle, spring means comprising a plurality of spring leaves secured adjacent one end to one end of said bumper plate and disposed between the latter and said axle the free end of said leaf spring extending in the same direction as the other end of said bumper plate so that said bumper plate overlies a portion of the free end of said leaf spring, and means for preventing shifting of said spring leaves with respect to said bumper plate.

3. A bumper for a vehicle having a frame and an axle normally disposed in spaced relation to said frame comprising, a bumper plate adapted to be secured in fixed relation with respect to said frame between the latter and said axle, a leaf spring comprising, a plurality of spring leaves secured adjacent one end to one end of said bumper plate and disposed between the latter and said axle, said spring leaves being provided adjacent their ends secured to said bumper plate with interfitting detent elements for preventing lateral and longitudinally shifting movement of said spring leaves relative to each other.

4. A bumper for a vehicle having a frame and an axle normally disposed in spaced relation to said frame comprising, a bumper plate adapted to be secured in fixed relation with respect to said frame between the latter and said axle, a leaf spring comprising a plurality of spring leaves secured adjacent one end to one end of said bumper plate and disposed between the latter and said axle, said spring leaves being provided adjacent their ends secured to said bumper plate with interfitting detent elements for preventing lateral and longitudinally shifting movement of said spring leaves relative to each other, and said bumper plate being provided with openings receiving the detents of the spring leaf immediately adjacent thereto for preventing lateral and longitudinally shifting movement of said leaf spring relative to said bumper plate.

5. A bumper for a vehicle having a frame member and an axle normally disposed in spaced relation to said frame member comprising, a bumper plate extending lengthwise of and adapted to be secured in fixed relation to said frame member between the latter and said axle, and a leaf spring secured adjacent one end to one end of said bumper plate and disposed between the latter and said axle, said leaf spring extending lengthwise in the same direction as said bumper plate with the latter overlying a portion of the free end of said spring.

MYERS Z. DELP.
LLOYD A. McCORMICK.